US007676408B2

(12) United States Patent
Moebs et al.

(10) Patent No.: US 7,676,408 B2
(45) Date of Patent: Mar. 9, 2010

(54) RISK IDENTIFICATION SYSTEM AND METHODS

(75) Inventors: G. Michael Moebs, Lake Forest, IL (US); Kenneth A. Williams, Waukegan, IL (US)

(73) Assignee: Moebs Services, Inc., Lake Bluff, IL (US)

( * ) Notice: Subject to any disclaimer, the term of this patent is extended or adjusted under 35 U.S.C. 154(b) by 1281 days.

(21) Appl. No.: 10/937,933

(22) Filed: Sep. 10, 2004

(65) Prior Publication Data
US 2005/0065872 A1 Mar. 24, 2005

(51) Int. Cl.
G06Q 40/00 (2006.01)
(52) U.S. Cl. .................. 705/35; 705/36 R; 705/38; 700/99
(58) Field of Classification Search .............. 705/35
See application file for complete search history.

(56) References Cited

U.S. PATENT DOCUMENTS

| 975,533 | A | 11/1910 | Kettering |
| 3,212,062 | A | 10/1965 | Goldman et al. |
| 3,394,246 | A | 7/1968 | Goldman |
| RE30,579 | E | 4/1981 | Goldman et al. |
| RE30,580 | E | 4/1981 | Goldman et al. |
| 4,270,042 | A | 5/1981 | Case |
| 4,346,442 | A | 8/1982 | Musmanno |
| 4,376,978 | A | 3/1983 | Musmanno |
| 4,485,300 | A | 11/1984 | Peirce |
| 4,597,046 | A | 6/1986 | Musmanno et al. |
| 4,774,663 | A | 9/1988 | Musmanno et al. |
| 4,823,264 | A | 4/1989 | Deming |
| 5,231,569 | A | 7/1993 | Myatt et al. |
| 5,237,159 | A | 8/1993 | Stephens et al. |
| 5,383,113 | A | 1/1995 | Kight et al. |
| 5,412,190 | A | 5/1995 | Josephson et al. |
| 5,504,677 | A | 4/1996 | Pollin |
| 5,532,464 | A | 7/1996 | Josephson et al. |
| 5,649,116 | A | 7/1997 | McCoy et al. |
| 5,689,579 | A | 11/1997 | Josephson |

(Continued)

OTHER PUBLICATIONS

Credit Risk, Credit Scoring and the Performance of Home Mortgages. Avery, Robert B., et al., Federal Reserve Bulletin, vol. 82 7, pp. 621-48, 1996.*

(Continued)

Primary Examiner—Hani. Kazimi
Assistant Examiner—Clifford Madamba
(74) Attorney, Agent, or Firm—Valauskas & Pine LLC

(57) ABSTRACT

The present invention relates to a system and methods by which the risk associated with a new opportunity or new or ongoing relationship may be assessed. An example of such new opportunity or new relationship for which the present invention may be used to assess the risk is that concerning a potential new customer of a financial institution. The risk assessment of the present invention may be used to assess whether a new customer should be taken on as a customer and, if so, to what extent should the possible full range of account benefits be provided to the new customer. Other applications include assessing risk regarding a candidate for employment, assessing casualty loss and/or repayment risk in the insurance industry, and assessing risk in a landlord tenant relationship to determine whether or not to rent to the prospective tenant and if so, the amount of the security deposit.

1 Claim, 5 Drawing Sheets

U.S. PATENT DOCUMENTS

| | | | |
|---|---|---|---|
| 5,691,524 | A | 11/1997 | Josephson |
| 5,727,249 | A | 3/1998 | Pollin |
| 5,783,808 | A | 7/1998 | Josephson |
| 5,819,236 | A | 10/1998 | Josephson |
| 5,819,239 | A | 10/1998 | Berson et al. |
| 5,826,243 | A | 10/1998 | Musmanno et al. |
| 5,832,465 | A | 11/1998 | Tom |
| 5,866,889 | A | 2/1999 | Weiss et al. |
| 6,019,282 | A | 2/2000 | Thompson et al. |
| 6,041,315 | A | 3/2000 | Pollin |
| 6,049,784 | A | 4/2000 | Weatherly et al. |
| 6,108,641 | A | 8/2000 | Kenna et al. |
| 6,119,103 | A | 9/2000 | Basch et al. |
| 6,131,810 | A | 10/2000 | Weiss et al. |
| 6,202,053 | B1 | 3/2001 | Christiansen et al. |
| 6,301,379 | B1 | 10/2001 | Thompson et al. |
| 6,321,206 | B1 | 11/2001 | Honarvar |
| 6,354,490 | B1 | 3/2002 | Weiss et al. |
| 6,754,640 | B2* | 6/2004 | Bozeman ............... 705/40 |
| 2003/0120586 | A1* | 6/2003 | Litty ...................... 705/38 |
| 2003/0130919 | A1* | 7/2003 | Templeton et al. ...... 705/35 |
| 2003/0135448 | A1* | 7/2003 | Aguias et al. ........... 705/38 |

OTHER PUBLICATIONS

Risk-rating systems bring consistency to commercial lending. Laudeman, Mark, Commercial Lending Review, v8 n3, pp. 28-39, summer 1993.*

* cited by examiner

FIG.2

200 MARKET LIMIT SCORE WORKSHEET

| FACTOR | EAST | MIDWEST | SOUTH | WEST | ADJUSTMENT | ACTUAL |
|---|---|---|---|---|---|---|
| SHELTER | 7539 | 5653 | 5070 | 8089 | 97.50% | 7887 |
| UTILITIES | 2480 | 2452 | 2463 | 2220 | 80.50% | 1787 |
| TRANSPORTATION | 5830 | 6967 | 6473 | 7120 | 99.20% | 7063 |
| TOTAL | 15849 | 14472 | 14006 | 17429 | | 16737 |
| MONTHLY | ÷12 | ÷12 | ÷12 | ÷12 | | ÷12 |
| RESULT | 1321 | 1206 | 1167 | 1452 | | 1394 |

FIG.3

300 INSTITUTIONAL LIMIT SCORE WORKSHEET

| FACTOR | TRUE MEDIAN OR AVERAGE VALUE |
|---|---|
| SHELTER | 3541 |
| UTILITIES | 1325 |
| TRANSPORTATION | 3512 |
| TOTAL | 11542 |
| MONTHLY | ÷12 |
| RESULT | 1660 |

FIG. 4

CHECKING ACCOUNT APPROVAL MATRIX
THE XYZ INSTITUTION – NEW ACCOUNTS

400

| 410 CHECK LIMIT | 408 CRA SCORE | 406 ⟶ NON-SUFFICIENT FUNDS (NSF) ACTIVITY CODE A | ABUSE OF OVERDRAFT PROTECTION CODE F | SAVINGS ACCOUNT ABUSE CODE G | DEBIT CARD REVOKED CODE K | ACCOUNT ABUSE OF ELECTRONIC TRANSFER ACCOUNT (ETA) CODE N | UNSATISFACTORY HANDLING CODE U | DRAWING AGAINST UNCOLLECTED FUNDS CODE W | 402 CHEXSYSTEM CLASSIFICATIONS — TRANSACTIONS INVOLVING ITEMS OR CHECKS RETURNED AS UNCOLLECTABLE CODE 2 | OVERDRAFT CODE 4 | UNINTENTIONAL ACCOUNT ABUSE CODE 6 | 404 NEGATIVE CODES: B,C,D,E,H, J,L,M,O,P, Q,R,T,V,Y, 1,3,5,7 |
|---|---|---|---|---|---|---|---|---|---|---|---|---|
| $1,200 | 800 | R | R | R | R | R | R | R | R | R | R | N |
| $1,200 | 780 | R | R | R | R | R | R | R | R | R | R | N |
| $1,200 | 760 | R | R | R | R | R | R | R | R | R | R | N |
| $1,200 | 740 | R | R | R | R | R | R | R | R | R | R | N |
| $1,200 | 720 | R | R | R | R | R | R | R | R | R | R | N |
| $1,200 | 700 | R | R | R | R | R | R | R | R | R | R | N |
| $1,200 | 680 | R | R | R | R | R | R | R | R | R | R | N |
| $1,200 | 660 | R | R | R | R | R | R | R | R | R | R | N |
| $1,200 | 640 | R | R | R | R | R | R | R | R | R | R | N |
| $1,200 | 620 | R | R | R | R | R | R | R | R | R | R | N |
| $1,200 | 616 | R | R | R | R | R | R | R | R | R | R | N |
| NSF | 580 | N | N | N | N | N | N | N | N | N | N | N |
| NSF | 560 | | | | | | | | | | R | N |
| NSF | 540 | | | | | | | | | | R | N |
| NSF | 520 | | | | | | | | | | R | N |
| NSF | 500 | | | | | | | | | | R | N |
| N | <500 | | | | | | | | | | | N |
| O | NO SCORE | | | | | | | | | | | N |

DEBIT SCORE

FIG. 5

CHECKING ACCOUNT APPROVAL MATRIX
THE XYZ INSTITUTION- EXISTING ACCOUNTS

500

DEBIT SCORE

| | | CHEXSYSTEM CLASSIFICATIONS ~502 | | | | | | | | | |
|---|---|---|---|---|---|---|---|---|---|---|---|
| 510 CHECK LIMIT | 508 CRA SCORE | NON-SUFFICIENT FUNDS (NSF) ACTIVITY CODE A | ABUSE OF OVERDRAFT PROTECTION CODE F | SAVINGS ACCOUNT ABUSE CODE G | DEBIT CARD REVOKED CODE K | ACCOUNT ABUSE OF ELECTRONIC TRANSFER ACCOUNT (ETA) CODE N | UNSATISFACTORY HANDLING CODE U | DRAWING AGAINST UNCOLLECTED FUNDS CODE W | TRANSACTIONS INVOLVING ITEMS OR CHECKS RETURNED AS UNCOLLECTABLE CODE 2 | OVERDRAFT CODE 4 | UNINTENTIONAL ACCOUNT ABUSE CODE 6 | NEGATIVE CODES: B,C,D,E,H, J,L,M,O,P, Q,R,T,V,Y, 1,3,5,7 |
| $1,200 | 800 | R | R | R | R | R | R | R | R | R | R | N |
| $1,200 | 780 | R | R | R | R | R | R | R | R | R | R | N |
| $1,200 | 760 | R | R | R | R | R | R | R | R | R | R | N |
| $1,200 | 740 | R | R | R | R | R | R | R | R | R | R | N |
| $1,200 | 720 | R | R | R | R | R | R | R | R | R | R | N |
| $1,200 | 700 | R | R | R | R | R | R | R | R | R | R | N |
| $1,200 | 680 | R | R | R | R | R | R | R | R | R | R | N |
| $1,200 | 660 | R | R | R | R | R | R | R | R | R | R | N |
| $1,200 | 640 | R | R | R | R | R | R | R | R | R | R | N |
| $1,200 | 620 | R | R | R | R | R | R | R | R | R | R | N |
| $1,200 | 616 | R | R | R | R | R | R | R | R | R | R | N |
| $1,200 | 580 | R | R | R | R | R | R | R | R | R | R | N |
| $1,200 | 560 | R | R | R | R | R | R | R | R | R | R | N |
| $1,200 | 540 | R | R | R | R | R | R | R | | | | N |
| $1,200 | 520 | R | R | R | R | R | R | R | | | | N |
| $1,200 | 500 | R | R | R | R | R | R | R | | | | N |
| NSF | <500 | | | | | | | | | | | |
| 0 | NO SCORE | | | | | | | | | | | N |

506 ↗  504 ↗

RISK IDENTIFICATION SYSTEM AND METHODS

FIELD OF THE INVENTION

The present invention relates generally to risk and its assessment. In particular, the invention relates to a system and methods by which the risk associated with a new opportunity or a new or ongoing relationship may be assessed, such as by businesses and institutions including those in the banking, thrift securities, insurance and credit industries, as well as the credit union movement. Among other applications, the system and methods may be used, for example, to assess whether a candidate for employment should be hired, and, if so, what responsibilities should the new hire be provided, the scope of responsibilities that a new or ongoing employee may be provided, whether a possible new customer should be taken on as a customer and, if so, to what extent should the full range of account benefits be provided to the new customer, and whether the range of account benefits previously provided to a customer should be eliminated altogether, narrowed, or expanded.

The present invention may also be used to assess risk in a landlord tenant relationship. The landlord can assess the risk of a prospective tenant in order to determine whether or not to rent to the prospective tenant and, if so, the amount of the security deposit.

Another application may be used in the insurance industry to assess casualty loss and/or repayment risk. Oftentimes after a loss, for example, a dwelling fire, the insurance company reimburses the homeowner for expenses as they are incurred. The present invention allows the insurance company to assess risk and allow reimbursement payments to be made in advance in the appropriate cases expediting the process and lower costs.

BACKGROUND OF THE INVENTION

Risk is a generally quantifiable measure of the likelihood of loss or less than expected results. Risk assessment is the process of analyzing such likelihood of loss or less than expected results or threats to and vulnerabilities of a system. Businesses and institutions assess risk on a daily basis and in a variety of contexts. For example, whether to engage a contractor to provide the services that the contractor claims it can provide involves an assessment of risk. The business must try to answer questions such as what is the likelihood that the contractor will be able to provide the services to the degree or quality requested or at the price or in the time frame stated. Whether to hire an individual as a new employee also involves an assessment of risk. Will the individual be able to perform as expected? Risk analysis with respect to potential new hires does not end there. While the individual may be suitable as a new hire, how much responsibility should the individual be given is another question the employer must try to answer. Should the new hire be given responsibility to handle the accounts of, for example, the employer's best customers? What about confidential or trade secret information? Should the new hire be given access to the some or all of the confidential information of the customers or access to sensitive or valuable inventory? Should the new hire be given access to the only certain or all of the confidential information of the employer.

Employers can also use the present invention to assess risk for new employees and the level of inventory security or access. Employers often have varying levels of inventory access such that some inventory is easily accessible while other inventory, such as inventory that is prone to loss, may be accessed only through additional security access. The present invention can assess the risk of each new employee to determine the level of inventory access.

Businesses and institutions in the banking, thrift securities, insurance and credit industries, and the credit union movement also assess risk with respect to a variety of services and financial instruments. For purposes of this application, the term "financial institution" will refer to banks, businesses and institutions in the banking, thrift securities, insurance and credit industries, and the credit union movement. A check is a commercial device intended for use as a temporary expedient for actual money. It is generally designed for immediate payment and not for circulation. A check is drawn on a bank or credit union. Immediately on presentment of the check, the financial institution is required to pay from a previous deposit of funds. Further, for purposes of this application, the term "check" will broadly signify any means by which the transfer of property from an account will be requested and will include those transfers also known by the terms "draft" and "share-draft" and "negotiable instrument" and instruments and transfers that are within the definition provided by Section 3-104 of the Uniform Commercial Code. In the broad sense used within this application, the term "check" will also signify the requests processed by automatic clearing houses, electronic presentations and debit card and ATM transactions and all electronic presentations.

From time to time, checking account holders may accidentally or intentionally misuse the account. The term "checking account" is generally recognized as including the terms Demand Deposit Account ("DDA"), electronic account, paper account, reservable/non-reservable transaction account, interest bearing account, sharedraft account, Negotiable Order of Withdrawal account ("NOW"), deposit account, Money Market Deposit Account ("MMDA"), Automatic Transfer Service account ("ATS"), escrow account, or any type of transaction account, or for purposes of this application will identify also any account in which funds are deposited or withdrawn.

The financial institution may allow the customer to draw one or more financial institution checks against the customer's account when the total amount of the check or checks exceed the amount in the account available for such purposes. A checking account, however, in its simplest form does not contractually obligate the financial institution to honor checks written by the customer that overdraw the account. For purposes of this application, the term "overdraft" will identify that which results when a transfer of property is requested but for which the account from the transfer is requested does not have the property in the amount or type identified in the request.

A financial institution has a number of options when a check is presented to it for which the customer does not have sufficient funds in the designated account. Some of the options require the financial institution to have an agreement in place with the requesting party before the financial institution can exercise the option.

One of the options that a financial institution may employ with respect to an overdraft is that the financial institution may transfer property from another account. The account may be one in which money is held so that a request for the payment of money can be handled without another step. The account may be one also in which one or more forms of equities are held so that a request to pay money requires that one or more equities be sold first. This option is one which is pre-arranged by the customer and the financial institution.

Another option that a financial institution may employ with respect to an overdraft is that the financial institution may transfer property according to a prearranged line of credit or a loan account of any loan account type. The decision to allow a line of credit on an individual account as well as the amount of the line of credit is determined through generally accepted loan underwriting criteria as well as factors applied by the financial institution through an employee who has expertise in such areas, for example a loan officer.

A third option that a financial institution may employ is simply to return the overdraft without making the requested transfer. This may be termed the "not sufficient funds", or "NSF" approach. The returned request may be considered as being "bounced". Often times, a financial institution charges a fee to the customer that drew the overdraft. This fee, at the very least, is intended to cover the administrative costs associated with handling the request. If it exceeds the costs associated with the handling the overdraft, the fee may be a punitive measure. The payee that did not receive the intended transfer may also charge the drawor a fee that may, at least, cover the drawee's administrative cost in seeking and obtaining the designated payment.

As a fourth option, a financial institution that is confronted with an overdraft can also cover it with the financial institution's own funds—thereby causing the account to be overdrawn. The financial institution will employ this option only when the financial institution is confident that the customer will be able to cover the deficit in the not too distant future. Such treatment is typically reserved for the financial institution's better customers, such as those having a long term relationship with the financial institution and possible other accounts. Even with this option, the financial institution usually charges a fee for the overdraft.

A financial institution that does cover an overdraft typically does so in one of two ways: (1) at the item level such that a bank employee analyzes each item presented that would overdraw an individual's account and makes a determination to pay or not, or (2) at the account level, but only up to an amount that is pre-set across the board for all overdrafts. For example, the financial institution may adopt a policy that provides that only those overdrafts that total no more than $500. in excess of the funds available in the customer's checking account are to be honored. Such a policy is advantageous to the financial institution in that it limits the risk it has to any one customer to a set low level. Such a policy, however, may be disadvantageous to the customer who is keenly interested in ensuring that, if any overdrafts are honored, those that may be larger in amount (than the low limit set by the financial institution) and are directed to important debts are honored. The typical size of payments to cover larger debts varies from location to location. For example, while a typical mortgage or real estate tax payment in a rural area may be a small amount (say less than $1000.), the same type of payment in a developed or developing urban area would likely be greater in amount (say more than $1000.). Thus, an overdraft service set by a national financial institution of, for example, $500., may be meaningless for critical payments, such as those for rent, mortgage, car, tax, and insurance purposes. For purposes of this application, payments that are needed to maintain some property right or benefit are termed "critical payments".

A financial institution that does adjust its overdraft limit for an individual customer does so but only generally after the financial institution has some extended experience in working with the customer and learning the customer's check writing habits. This requires the financial institution to expend critical resources (such as the time of the account representative assigned to handle the customer's account or the operations person assigned to handle the customer's account). It is certainly an approach that a financial institution can take only with respect to a few customers. Also, while the account representative may believe it is clear what the check writing habits of the customer are, this takes the financial institution time.

Rather than addressing the matter on an ad hoc basis, the financial institution may anticipate that the customer may draw an overdraft from time to time. For example, the financial institution and customer may enter into an expanded relationship under which the financial institution provides the customer a line of credit tied to the customer's checking account. The financial institution would then be obligated to pay on checks up to the maximum amount of the line of credit provided for this purpose. This expanded relationship with customers is commonly marketed by financial institutions under designations such as "overdraft protection", "check-protection", or "checking-plus" personal financial banking accounts. For drawing checks for which the checking account has insufficient funds, and employing the designated line of credit, a customer typically pays, at the least, on a per transaction basis and the interest for the credit actually extended to the customer.

The customer may avoid overdrafts also by pre-authorizing the financial institution to tie the customer's checking account to one or more of the customer's other accounts such as the customer's deposit accounts. The financial institution, when presented with a check that exceeds the amount in a customer's checking account, "sweeps" the necessary funds to cover the check from the designated deposit account or accounts.

While a number of different options are available to customers by which the customer may have overdrafts handled automatically, most customers do not take advantage of them. Customers are attracted to financial institutions by the low fees associated with simple checking accounts. Customers are wary of the fees associated with any extra services that financial institutions are capable of rendering such as those with lines of credit or sweep accounts. Also, customers do not wish to spend the small amount of time needed to set up the lines of credit or sweep accounts. Further, customers may not have the funds to establish another account—or may not have the funds in a "liquid" form. "Liquid means cash or the equivalent that can be converted to cash within a specified time limit. For example, a CD is not liquid because it cannot be converted to cash prior to its due date without a substantial penalty. Most customers additionally do not anticipate overdrawing their checking account.

Accordingly, financial institutions find themselves in the position of how to handle overdrafts for a large number of customers. Without a protocol in place for such customers not covered by one of the financial institution's other account programs designed to cover overdrafts—such as a sweep account or a checking account with a line of credit—, the financial institution must determine whether in all cases to simply refuse to honor the check or to pass the matter to the customer's account representative who must determine whether it is in the long term best interest of the financial institution to cover the check. Again, this item by item approach in handling such matters diverts the resources of the financial institution that may be better spent on other matters. Having to handle such matters on an ad hoc basis makes it difficult for a financial institution to allocate their resources. For example, an account representative may go for a long period of time without having to handle issues concerning an overdraft or overdrafts, then have to handle many of them on one day. Other issues that the account representative had to handle on that day may have to be sacrificed in order to handle the overdrafts. Given the limited amount of information that may be available to the account representative, it may be difficult for the representative to assess the risk and determine whether it is in the best interest of the financial institution to cover the overdraft. The shorter amount of time that a customer has been with the financial institution, the more speculative this estimate is, and the higher the risk to the financial institution. Also, because this process is judgmental, the risk assessment may not be uniform or consistent from one service representative to another. This opens the additional risk of discrimination through unequal or disparate treatment of account holders.

To decrease some of the risk, the financial institutions look to the information presented to them when the customer opened the account. Before a financial institution opens a demand deposit or a checking account for a prospective customer, the financial institution ordinarily requires that the prospective customer supply a certain amount of information. Such information is required to verify personal identification and to provide an alert against any negative information, such as lack of steady employment, lack of extended time at any one residence, or past poor relationships with other financial institutions. A preliminary screening of prospective customers serves to increase the predictability and reliability of subsequent transactions and thus allows the financial institution to better manage the account. A customer that provides information that satisfies the standards of the financial institution to open a checking account is said to be "qualified". Standards of a financial institution include the presentment of a government issued photo identification card that confirms the individual's identity, and successfully passing an assessment of prior checking performance at other financial institutions, for example, screening for no negative past checking performance. Although, these are generally minimal requirements, financial institutions have the discretion to further require satisfactory credit history.

However, the information provided to the financial institution to qualify for an account typically does not provide the financial institution with specific information on the normal check writing habits of the particular customer or other customers similarly situated as the particular customer. Does the customer typically maintain a minimum amount of money in the checking account to cover certain payments while other money is, for example, kept in a deposit account? Does the customer typically write checks to cover the customer's rent or mortgage payment or automobile payment just before or contemporaneously with making a deposit so that the financial institution is often presented with one or more checks before the deposit funds have cleared? Does the customer, when contacted by the customer's account representative about the possible overdraft, immediately rectify the situation such as by authorizing amounts to be shifted from, for example, a deposit account to the checking account?

With only the scant qualifying information, and without specific information concerning the customer's behavior, the financial institution must make a decision whether to cover the check. Financial institutions, therefore, are in need of a system and methods to assist them in determining for what customers to pay on unsupported checks and the extent to which such checks should be covered. The present invention satisfies the demand.

SUMMARY OF THE INVENTION

The invention relates to a system and methods by which the risk associated with a new opportunity or new or ongoing relationship may be assessed. One example of such new opportunity or new relationship for which the present invention may be used to assess the risk is that concerning a potential new customer of a financial institution. The present invention may be used to assess whether a new customer should be taken on as a customer and, if so, to what extent should the possible full range of account benefits be provided to the new customer.

Another example of such new opportunity or new relationship is that concerning a candidate for employment. The system and methods may be used, for example, to assess whether a candidate for employment should be hired, and, if so, what responsibilities should the new hire be given.

An example of an ongoing relationship for which the present invention may be used to assess the associated risk is that concerning a current customer of a financial institution. The system and methods of the present invention may be used to determine whether the range of account benefits previously provided to the customer should be eliminated altogether, narrowed, or expanded. The present invention provides a system and methods that assist those that are presented with a property transfer request to make more fully informed decisions whether to honor the transfer request when the property in a customer's account are insufficient to cover the request. The system and methods may be employed by the financial institution at the time the customer first establishes a relationship with the financial institution or later.

The present invention may also be used to assess risk in a landlord tenant relationship. The landlord can assess the risk of a prospective tenant in order to determine whether or not to rent to the prospective tenant and, if so, the amount of the security deposit. Further, a landlord may use the present invention's system and methods to assess the original security deposit at the time of renewal of the lease. For example, the landlord may return partial or all of the original security deposit enticing the tenant to renew the lease, or increase the amount of the security deposit to discourage the tenant from renewing the lease.

The system and methods are used, in part, to set a monetary standard or standards below which an overdraft or overdrafts would be honored. Unlike existing overdraft systems—which utilize an overdraft service that is set at a low level in order that the financial institution may assume the least amount of financial risk and apply it at individual financial institutions widely dispersed over a large geographic area—the system and methods according to the present invention do not set this standard or standards wholly based upon the individual personal characteristics of a customer or financial institution customer; rather, the system and methods set this standard, in part, by depersonalized statistical third party information for the geographic region in which the financial institution is located. The depersonalized statistical third party information includes the shelter and transportation costs for the area where the financial institution is located. Transportation costs include the monthly payment or other payment for the purchase or lease of an automobile. Shelter costs include the monthly payment or other payment for the purchase or lease of a dwelling.

The system includes three components, some or all of which the financial institution may use depending on whether the customer is an existing customer or a new customer.

For purposes of utilizing the system, the financial institution may decide that an "existing customer" is a customer that has had a checking account with the financial institution for any period of time—no matter how small—or one that has had a checking account with the financial institution for greater than a certain minimum period of time (for example, three months).

One embodiment of the system utilizes both a check verification report and a credit rating score to determine whether to accept overdrafts from a new customer that do not exceed an overdraft service for new customers. Other embodiments of the system utilize personal and depersonal information from third party sources.

For purposes of this application, third party sources includes credit bureaus such as Equifax, TransUnion and Experian, check reporting agencies—such as ChexSystems and TeleCheck, apartment rental tracking agencies, and public records such as criminal records.

A new customer may be considered by the financial institution to be a customer that seeks to open a checking account (and, therefore, is not actually a checking account customer yet) or one that has had a checking account but for a period of time less than that certain minimum period of time set to qualify the customer as an "existing customer" (described above). The overdraft service for a new customer may be the same or different (for example, higher) as that for an existing customer. The credit rating score is obtained for the new customer from a provider of such services, such as Equifax, Experian, or TransUnion. The financial institution obtains also a check verification report from a provider of such services. One such provider is "ChexSystem™". The financial institution may choose to honor overdrafts only for those new customers that obtain both an acceptable credit rating score and a satisfactory check verification report. However, if the check verification report shows, for example, that the new customer has engaged in past fraudulent or other behavior deemed by the financial institution to be entirely unacceptable, the financial institution can refuse to open a checking account for those new customers. If the check verification report shows, for example, that the new customer has committed certain acts (such as abuse of checking privileges) but had not engaged in past fraudulent or other behavior deemed by the financial institution to be entirely unacceptable, the financial institution can open a checking account for the new customer provided the customer's credit rating score is at or above a designated cut-off.

Differing overdraft amounts can also be determined on an account-by-account or customer-by-customer basis. For example, one customer would be allowed an overdraft of $1,000 while another customer would be allowed an overdraft of $2,000.

In order to address overdrafts written by existing customers of the financial institution ("overdraft service"), the financial institution decides what the maximum amount of overdrafts that customers having a certain credit rating score will be honored by the financial institution. The amount of overdrafts could be a set amount for all customer accounts or could vary from customer to customer depending on their individual risk profile. For existing customers of the financial institution— such as those that had a checking account with the financial institution for more than three months—a credit rating score is obtained for the customer, for example, from Equifax, although it is within the financial institution's discretion to first obtain a check verification report for the existing customer.

In order to ensure that the decisions made with respect to new customers and existing customers were sound decisions, the system and methods may be used to check on a periodic basis (such as annually) whether those to whom overdraft service was not extended can now be extended or whether overdraft service should continue to be provided to those to whom were provided such protection and whether the limit is to be increased, decreased or remain the same. In addition, the system and methods may be used to modify the amount of the overdraft service that will be honored.

The financial institution may adjust the standards with time to increase or decrease those to whom overdraft service is extended such as by adjusting the designated cut-off of the credit rating score of the system and methods.

A financial institution that uses the system and methods will honor one or more overdrafts written by a customer to whom overdraft service was extended by the financial institution, provided the sum total of the one or more overdrafts does not exceed the overdraft service limit. For covering the overdraft or overdrafts, the financial institution will assess a fee and notify the customer that the payment of the overdraft is due. The customer must deposit sufficient funds to cover the overdraft or overdrafts within a stated period of time. If the customer does not deposit the required funds within the stated period of time, the financial institution may provide a second notice and/or take other steps such as closing the customer's checking account and/or turning the matter over to a collection agency.

As a result of using the system and methods, the financial institution will have four options available to it. First, the checking account will be opened and an overdraft service established for the account. As a result, the financial institution may honor overdrafts, up to the amount of the overdraft service limit. Second, the checking account will be opened without any overdraft service. The financial institution will be left to decide on an ad hoc basis whether to honor the overdraft. If, for example, an account representative is unable to decide, the financial institution would likely not honor the overdraft. Third, the financial institution may choose not to open the checking account for the new customer or lastly, for an existing customer, close the account, reduce the limit, increase the limit, or add an overdraft capability if the account did not already have it.

One advantage of the system is that it permits financial institutions to make more fully informed decisions with respect to overdrafts and risk assessment in advance of the actual presentation of a check that overdraws an account.

Another advantage is that it permits financial institutions to maintain or improve customer relationships by not refusing to honor checks that are critical to the customer such as those that are more sizeable in amount and are drawn to pay the customer's rent, mortgage, or car payment. Financial institutions, like other businesses in services industries are always trying to maintain and improve customer satisfaction.

An added advantage of the present invention is that it provides a protocol by which overdrafts are handled automatically and uniformly. Therefore, costly resources—such as the time of account representatives—need not be diverted on an ad hoc basis. The expenses associated with handling overdrafts are decreased. In addition, the invention avoids the possibility that different decisions will be made by account representatives—thus, eliminating the possibility that standards will be applied inconsistently. Furthermore, the use of a risk-based system better allows a financial institution to manage risk based on objective data, and to determine the level of risk, in a quantifiable way, that the institution wants to accept.

An additional advantage of the present invention is that by providing this service to customers even for a fee, customers are more likely to use it, thereby providing an additional source of revenue for financial institutions.

BRIEF DESCRIPTION OF THE DRAWINGS

FIG. 2 is a Market Limit Score Worksheet according to one embodiment of the present invention;

FIG. 3 is an Institutional Limit Score Worksheet according to one embodiment of the present invention;

FIG. 4 is a Checking Account Approval Matrix for new checking accounts according to one embodiment of the present invention;

FIG. 5 is a Checking Account Approval Matrix for existing checking accounts according to one embodiment of the present invention.

DETAILED DESCRIPTION

Figure 1:
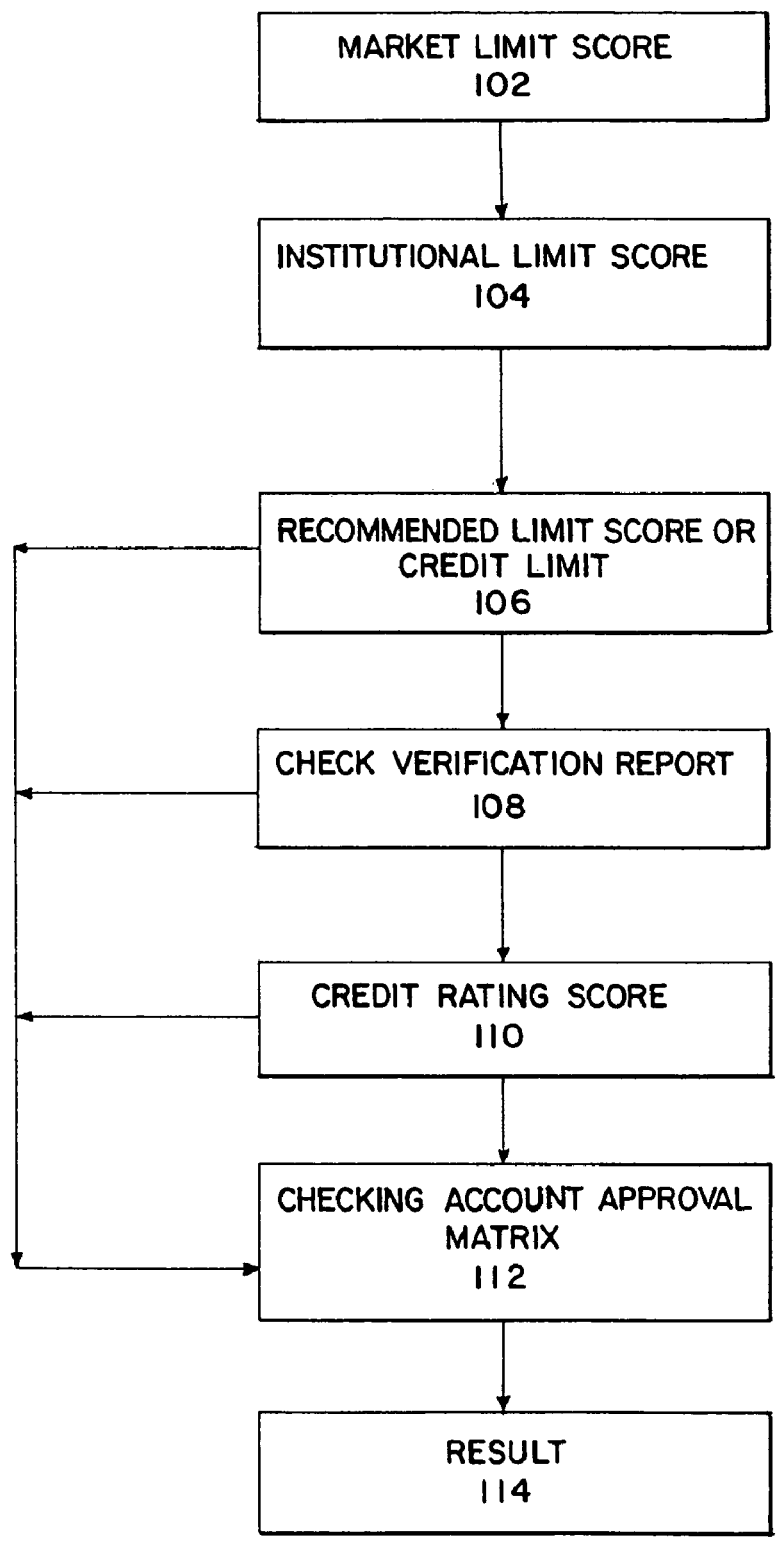
FIG. 1 is a flow chart of the system and method according to one embodiment of the present invention.

The present invention will now be described in detail with reference to one of many possible embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one application of the present invention, improved risk assessment techniques are provided that optimize financial institution revenue while controlling losses resulting from the financial institution covering an overdraft or overdrafts. Unlike prior art risk assessment techniques, which typically employ only historical payment data for financial risk assessment purposes, the present invention assesses risk in part by depersonal information for the geographic region in which the financial institution is located. The financial institution evaluates depersonal information in addition to personal information to determine the amount of overdraft service, if any, to offer a particular customer. Depersonal information and personal information can include, for example, shelter and transportation costs. Personal information, in addition, can include credit rating score and check history.

Fees are typically charged if a customer's withdrawal exceeds the amount of funds in the customer's account. The individual financial institution will assess the applicable fee established in advance by that institution; although, whether a financial institution charges a fee is within the discretion of each financial institution. The embodiment of the present invention described is a method of assessing risk to determine which customer's receive overdraft service and the amount of the benefit.

When a customer writes a check or withdraws in excess of the amount within the customer's account, the financial institution is presented with several options. The financial institution may provide overdraft service by advancing funds to the customer to cover the deficit, such as an electronic fund transfer ("EFT") from another account if the customer has one (such as a deposit account, checking account or money market account) or from a line of credit, such as a credit card. The financial institution may refuse to pay the deficit. Finally, the financial institution may offer overdraft service where the financial institution voluntarily covers the deficit determined by the method of the present invention.

To determine whether a customer is offered overdraft service and the amount of the benefit, a Market Limit Score Worksheet and Institutional Limit Score Worksheet are completed in addition to consulting a Checking Account Approval Matrix. The Market Limit Score Worksheet provides a market limit score based on depersonal information for the location where the financial institution is located. An institutional limit score is then calculated. While the market limit score is based on depersonal information, the institutional limit score is based on personal information. The depersonal information and personal information includes shelter, utilities and transportation costs, although various other variables can be considered.

After the market limit score and institutional limit score are determined, a recommended limit score is calculated. The recommended limit score, or check limit, is the amount the financial institution offers customers to optimize its revenue while controlling losses. The financial institution can adjust the check limit upon the financial institution's discretion. Adjusting the check limit above the recommended limit score increases the level of risk and revenue generated. Adjusting the check limit below the recommended limit score reduces the level of risk and revenue generated. Adjustments may be made according to the business practices and objectives of the financial institution. Thus, the limits defined by large corporate financial institution entities, having multiple branch offices and locations, may be differentially adjusted from smaller financial institutions or independent credit unions.

FIG. 1 illustrates, in accordance with one embodiment of the invention, a flow chart of the system and method of assessing financial risk 100 to determine which customer accounts to approve for overdraft services and the amount of approval. The market limit score is calculated in step 102. The market limit score is calculated from depersonal information, including the annual expenses of shelter, utilities and transportation, determined by socioeconomic data estimated for the region where the financial institution is located. The data is obtained from cost of living indices collected by the United States Census Bureau, Consumer Price Index and other publicly available statistical data sources. Shelter, utilities and transportation can be determined to at least a proper approximation by estimating ordinary and expectable price levels for basic commodities from socioeconomic data.

In step 104, the institutional limit score is calculated from personal information of the customers in the financial institution's market. The institutional limit score is the true median or average value of shelter, utilities and transportation for the actual customers of the financial institution. The data is collected by assessing the institution's loan portfolio for mortgage loans, car loans, and credit card loans. The median and mean average payment for each of these categories with respect to the market area where the institution is located is compared to the financial institution's customers actual data.

The recommended limit, or check limit, is objectively determined in step 106 based on the market limit score and institutional limit score. The check limit is the amount the financial institution offers customers to optimize its revenue while controlling losses. Optimal risk reward tradeoff occurs by selecting a check limit between the institutional limit score and market limit score. The check limit is entered into the Checking Account Approval Matrix (step 112).

In step 108, a customer's check verification report is obtained from a provider of such services. ChexSystem™ and TeleCheck™ are providers of check verification reports. The ChexSystem™ network is made up of member financial institutions and credit unions that regularly contribute information on mishandled checking and deposit accounts to a central location. This information is shared with financial institutions to help them assess the risk of opening new accounts or the risk of offering an existing customer overdraft service. ChexSystem™ provides verification services to aid financial institutions in identifying account applicants who may have a history of account mishandling, for example, people whose accounts were overdrawn (NSF activity) and then closed by them or by their financial institution. Other verification factors include debit card revocation, repeated drawings on uncollected funds, overdraft service abuse, deposit account abuse, writing a check on a closed account, ATM machine abuse, and providing false information when opening an account. The financial institution, within its discretion, may decide not to consult ChexSystem™ data for existing customers, although, ChexSystem™ data is always obtained on new customers. The ChexSystem™ data obtained is compared to corresponding data in the Checking Account Approval Matrix (step 112).

Check verification reports include negative information and abuse information, further explained below. If the customer's check verification report contains certain negative information, the new customer is not offered a checking account (no account opens) or an existing customer's checking account is closed in step 114.

Existing customers and new customers may be defined within the discretion of the financial institution. For example, if a checking account has not been open for three or more months, the customer is considered a new customer. A checking account that has been open for three months or more defines an existing customer.

After the ChexSystem™ data is obtained, and if no certain or pre-defined negative information was revealed, the customer's credit rating score is obtained in step 110. Credit rating scores can be obtained from providers such as Equifax, Experian or TransUnion. The credit rating score obtained for a particular customer is compared to corresponding data in the Checking Account Approval Matrix (step 112).

The Checking Account Approval Matrix, in step 112, is reviewed. The customer's ChexSystem™ data and credit rating score are found on the matrix to reveal an alphabetic designation code that defines the financial institution's option.

One of three results is obtained from the Checking Account Approval Matrix in step 114. First, the financial institution provides a checking account with overdraft service, in which case the financial institution covers an overdraft or overdrafts, up to the check limit, when a customer withdraws an amount that exceeds the amount of funds in the customer's account. Second, the financial institution provides a sub-prime checking account, in which case the financial institution does not cover an overdraft or overdrafts. A sub-prime checking account is a basic or standard checking account without "frills" or additional benefits. Lastly, the financial institution does not provide a checking account—a checking account is not opened for a new customer or the checking account is closed for an existing customer.

FIG. 2 illustrates one embodiment of a Market Limit Score Worksheet 200 according to the invention. Through the use of the Market Limit Score Worksheet 200, a market limit score 202 based on depersonal information may be calculated. Depersonal information includes information such as the annual expenses of shelter 204, utilities 206, and transportation 208, determined by socioeconomic data estimated for the region where the financial institution is located. Shelter 204 includes, for example, mortgage or rent data. Utilities 206 include, for example, data for telephone, cable, gas, electric, water, garbage and fuel for transportation. Transportation 208 includes, for example, car payment or lease payment data. The socioeconomic data is compiled from sources such as Bureau of Labor, Census Bureau, Customer Price Index (CPI), or Metropolitan Statistical Area (MSA) data. Information from such sources estimates the costs of shelter 204, utilities 206, and transportation 208. This depersonal information is typically assessed for the region where the financial institution is located, for example, East 216, Midwest 218, South 220, and West 222 for the United States. The geographical areas of East 216, Midwest 218, South 220, and West 222 are defined by the Census Bureau.

After the annual expenses of shelter 204, utilities 206, and transportation 208 are estimated for the region where the financial institution is located, they may be subjected to an adjustment percentage 214, if necessary. The adjustment percentage 214 is determined from Customer Price Index data. It is a percent of the standard or base line values of shelter 204, utilities 206, and transportation 208 for the particular area where the financial institution sits. The baseline values are determined by location. There are four baselines, one for each region of the country: East, Midwest, South, and West. The adjustment percentage 214 may be different for each value of shelter 204, utilities 206, and transportation 208. An actual value 224 is determined after the adjustment percentage 214 is applied. Each actual value 224 for shelter 204, utilities 206, and transportation 208 are summed to obtain total annual value 210. The total annual value 210 is divided by twelve for a monthly market limit score 202.

FIG. 3 is an Institutional Limit Score Worksheet according to the invention. The Institutional Limit Score Worksheet 300 provides the institutional limit score 302 calculated from personal information of the customers in the financial institution's market. The institutional limit score is the true median or average value 312 of shelter 304, utilities 306, and transportation 308 for the actual customers of the financial institution. The true median or average annual value (or commonly statistical value) 312 of shelter 304 and transportation 308 can be obtained, for example, through actual financial statements of the customer, from information the customer presented to the financial institution when the customer opened the account, or from the average of all the financial institution's customers for which they have payment information. The true median or average annual value of utilities 306 can be obtained, for example, through a customer's credit card. A customer's credit card data provides a valuable correlation or proxy for utilities 306, which is typically two times the median or average annual credit card payment. The true median or average value 312 for shelter 304, utilities 306, and transportation 308 are summed to obtain total annual value 310. The total annual value 310 is divided by twelve for a monthly institutional limit score 302.

A recommended limit score, or check limit, is objectively or subjectively determined based on the values of the market limit score 202 and institutional limit score 302. The recommended limit score, or check limit, is the amount the financial institution covers customer overdrafts to optimize its revenue while controlling losses. The financial institution optimizes the risk reward tradeoff by selecting a check limit between the institutional limit score 302 and market limit score 202. An example of objectively determining the check limit is calculating an average of the market limit score 202 and institutional limit score 302. An example of subjectively determining the check limit is interpolating a value between the market limit score 202 and institutional limit score 302.

The financial institution can adjust the check limit upon the financial institution's discretion and based on tolerance and risk policy. Factors a financial institution would adjust the check limit include: market conditions, number of branches the financial institution comprises, number of markets the financial institution serves, location of the financial institution and appetite for risk. The financial institution may opt to tier the check limit, for example, the check limit could be incremented and/or decremented by one hundred dollars $100 before it is inserted into the Checking Account Approval Matrix. The increment or decrement of the check limit is entirely up to the financial institution's discretion. For example, the financial institution may increment the check limit because they want to attract a more affluent customer than they currently have and a higher limit would be more attractive.

The check limit is inserted into the Checking Account Approval Matrix. FIG. 4 is a Checking Account Approval Matrix for new checking accounts according the invention and FIG. 5 is a Checking Account Approval Matrix for existing checking accounts according the invention. The check limit is inserted into the Checking Account Approval Matrix from which the overdraft service is determined. The matrix determines if a customer will receive overdraft service, and, if so, for what amount. The amount can be the same for all customers or different for each customer based upon the risk analysis of the matrix. The matrix is used by the financial institution at the time the customer opens an account or to evaluate an existing customer.

Based on review of the matrix, one of three conclusions will be reached by the financial institution for a particular customer, either a new or existing customer. First, the financial institution provides a checking account with overdraft service, in which case the financial institution covers an overdraft or overdrafts, up to the check limit, when a customer withdraws an amount that exceeds the amount of funds in the customer's account. Second, the financial institution provides a sub-prime checking account, in which case the financial institution does not cover an overdraft or overdrafts. Lastly, the financial institution does not provide a checking account—a checking account is not opened for a new customer or the checking account is closed for an existing customer. A new customer may be defined as having a checking account with the financial institution for three months or less. An existing customer may be defined as having a checking account with the financial institution for three months or more.

FIG. 4 is a Checking Account Approval Matrix for new sharedraft accounts according the invention. The Checking Account Approval Matrix for new checking accounts 400 includes personal sharedraft history data 402, or ChexSystem™ classification data. Sharedraft history verification data can be obtained from providers including ChexSystem™ or TeleCheck™. The Checking Account Approval Matrix 400 also includes Consumer Reporting Agency or credit bureau (CRA) score 408 and the check limit 410.

The CRA score 408 values are inserted into the matrix 400. The CRA scores are empirically derived using proven statistical methodology and predicts the likelihood of loss at given check limits 410. For example, a high score may have a statistical prediction of low loss but as the score decreases the likelihood of loss increases. The CRA score 408 is used to determine the amount of the overdraft or check limit 410 allowed. Customers with a higher score (low risk), may be entitled to a higher check limit while customers with a lower score (high risk) may be offered a lower check limit. Overdraft is not offered typically where the risk is too great. The CRA score 408 column may consist of differing values including varying increments. For example, Checking Account Approval Matrix 400 includes CRA score 408 values of 800, 614, less than 500, and no score.

The check limit 410 is based on the values of the market limit score 202 and institutional limit score 302. The financial institution may opt to tier the check limit within the Checking Account Approval Matrix. For example, the check limit could be incremented and/or decremented by one hundred dollar $100 amounts. Checking Account Approval Matrix 400 includes check limit 410 of, for example, $1200, non-sufficient funds (NSF), and zero. The check limit 410 can be tiered, such that the check limit is incremented and/or decremented by one hundred dollar $100 amounts using the market limit score and the institutional limit score statistical average as a base. For example, a Consumer Reporting Agency score 408 of 660 corresponds to a check limit 410 of $1300. and a Consumer Reporting Agency score 408 of 680 corresponds to a check limit 410 of $1400.

This ChexSystem™ classification data 402 includes negative information 404 and abuse information 406. Negative information 404 includes, for example, writing checks on a closed account, false information used in opening an account, excessive drawing on uncollected funds, automatic teller machine (ATM) abuse, transactions involving forgery, transactions involving draft returned stop payment, or transactions involving items belonging to a deceased party. The negative information 404 listed above corresponds to a code within the ChexSystem™ report. For example, a customer's ChexSystem™ report that reveals a negative code of B defines that the customer wrote checks on a closed account.

Abuse information includes, for example, non-sufficient funds (NSF), abuse of overdraft protection, share account abuse, debit card revoked, account abuse of electronic transfer account (ETA), unsatisfactory handling, drawing against uncollected funds, transactions involving items or checks returned as uncollectable, overdrafts and unintentional account abuse. The abuse information 406 listed above corresponds to a code within the ChexSystem™ report. For example, a customer's ChexSystem™ report that reveals an abuse code of F defines that the customer abused overdraft protection.

When a new customer applies for a checking account, the financial institution obtains ChexSystem™ classification data 402 for the customer. If a new customer's ChexSystem™ classification data 402, or personal sharedraft history data, includes negative information 404, the financial institution does not offer the new customer a checking account.

If a new customer's ChexSystem™ classification data 402 includes abuse information 406, the financial institution either offers the new customer a checking account with overdraft service, a checking account without overdraft service or no checking account opens. To determine what type of account to offer the new customer, the customer's credit rating score 408 is obtained. Credit rating scores can be obtained from Consumer Reporting Agencies such as Equifax, Experian, or TransUnion. The higher the credit rating score the better the customer's credit. The customer's credit rating score is compared the Consumer Reporting Agency score 408 of the matrix 400.

The overdraft service offered to the customer is determined by locating the abuse information 406 from the customer's ChexSystem™ report in addition to the customer's credit rating score in the matrix 400. Again, if the customer's Chex- System™ report shows any negative information 404 that is considered serious, the customer is not offered a checking account and the customer's credit rating score is not obtained. After locating the customer's abuse information 406 in the matrix 400, the customer's credit rating score is located within the Credit Reporting Agency score 408 column. An alphabetic designation code is obtained in the matrix 400 where the abuse information 406 column meets the customer's credit rating score within the Credit Reporting Agency score 408 column. Depending on the alphabetic designation code obtained, the financial institution either offers the new customer a checking account with overdraft service, a sub-prime checking account, in which case the financial institution does not cover an overdraft or overdrafts, or the financial institution does not open a checking account for the new customer. For example, an alphabetic designation code of S defines that the financial institution provides a sub-prime checking account, in which case the financial institution does not cover an overdraft or overdrafts. An alphabetic designation code of N defines that the financial institution does not provide a checking account—a checking account is not opened for the new customer. An alphabetic designation code of R defines that the financial institution provides a checking account with overdraft service, in which case the financial institution covers an overdraft or overdrafts, up to the check limit, when a customer withdraws an amount that exceeds the amount of funds in the customer's account. If the alphabetic designation code is R, the check limit 410 column is consulted for the overdraft service amount. This is the amount the financial institution covers an overdraft or overdrafts when a customer withdraws an amount that exceeds the amount of funds in the customer's account. Examples are presented below.

If a new customer's ChexSystem™ report reveals negative information 404 such as a negative code B (the customer wrote checks against a closed account), the matrix reveals a N. The customer is not offered a checking account with the financial institution, therefore, the customer's credit rating score does not need to be obtained.

If a new customer's ChexSystem™ report reveals abuse information 406 such as an abuse code W (the customer drew against uncollected funds), the customer's credit rating score is obtained. If the customer's credit rating score is 680, the corresponding alphabetic designation code within the matrix 400 reveals a R. Therefore, the financial institution would offer the new customer a checking account with an overdraft service. Referencing the check limit 410, the financial institution would cover up to $1200. if the customer withdraws more than the amount of funds in the customer's account.

If a new customer's ChexSystem™ report reveals abuse information 406, such as an abuse code A (non-sufficient fund (NSF) activity), the customer's credit rating score is obtained. If the Credit Reporting Agency does not have a credit rating score for the customer (the customer's credit rating score is "no score"), the customer is offered a sub-prime checking account without overdraft service (since the matrix 400 revealed an alphabetic designation code of S).

As another example, if the new customer's ChexSystem™ report reveals abuse information 406, such as unsatisfactory handling (abuse code U), the customer's credit rating score is obtained. If the customer's credit rating score is 480, the corresponding alphabetic designation code within the matrix 400 reveals a N. Therefore, the financial institution would not offer the new customer a checking account.

If a new customer's ChexSystem™ report reveals abuse information 406 such as an abuse code 4 (previous overdrafts), the customer's credit rating score is obtained. If the customer's credit rating score is 613, the corresponding alphabetic designation code within the matrix 400 reveals a S. Therefore, the financial institution would offer the new customer a sub-prime checking account without overdraft service. The financial institution would return drafts, designated NSF, if the customer withdraws more than the amount in the customer's account.

As a final example, if the new customer's ChexSystem™ report reveals negative information 404, such as ATM abuse (negative code of H) the customer's credit rating score is not obtained since the financial institution would not open or offer the customer a checking account.

FIG. 5 is a Checking Account Approval Matrix for existing checking accounts according the invention. The Checking Account Approval Matrix for existing checking accounts 500 includes personal sharedraft history data 502, or ChexSystem™ classification data. The ChexSystem™ classification data 502 includes negative information 504 and abuse information 506 described above. The Checking Account Approval Matrix 500 also includes Consumer Reporting Agency (CRA) score 508 and the check limit 510. Again, the check limit 510 can be tiered, such that the check limit is incremented and/or decremented by $100 amounts using the market limit score and the institutional limit score statistical average as a base.

The financial institution may assess an existing customer's account annually to determine if the financial institution should provide overdraft service. With an existing customer account, it is within the financial institution's discretion to obtain the existing customer's ChexSystem™ report or rely solely on the customer's credit rating score.

If the customer's ChexSystem™ report shows any negative information 504 that is considered serious, the existing customer's account is closed and the customer's credit rating score is not obtained. If an existing customer's ChexSystem™ classification data 502 includes abuse information 506, the financial institution either offers the existing customer an overdraft service on their checking account or no overdraft service is extended to the customer.

The overdraft service offered to the customer is determined by reviewing the matrix 500 for the negative information 504 and abuse information 506 obtained from the customer's ChexSystem™ report. If no negative information 504 is returned in the customer's ChexSystem™ report, the customer's credit rating score is obtained.

After locating the customer's abuse information 506 in the matrix 500, the customer's credit rating score is located within the Credit Reporting Agency score 508 column. An alphabetic designation code is obtained in the matrix 500 where the abuse information 508 column meets the customer's credit rating score within the Credit Reporting Agency score 508 column. Depending on the alphabetic designation code obtained, the financial institution either offers the existing customer overdraft service with their existing checking account (alphabetic designation code of R), a sub-prime checking account without overdraft service (alphabetic designation code of S), in which case the financial institution does not cover an overdraft or overdrafts or the financial institution closes the existing customer's checking account (alphabetic designation code of N). If the alphabetic designation code is R, the check limit 510 column is consulted for the overdraft service amount. This is the amount the financial institution covers an overdraft or overdrafts when a customer withdraws an amount that exceeds the amount of funds in the customer's account. Several examples are presented below.

The overdraft service is determined from all data in the Checking Account Approval Matrix 500. If an existing customer's ChexSystem™ report reveals negative information 504 such as a negative code B (the customer wrote checks against a closed account), the matrix reveals a N. The existing customer's checking account is closed with the financial institution, therefore, the customer's credit rating score does not need to be obtained. Additional examples are presented below.

If an existing customer's ChexSystem™ report reveals abuse information 506 such as drawing against uncollected funds (abuse code W), the customer's credit rating score is obtained. If the customer's credit rating score is 680, the corresponding alphabetic designation code within the matrix 500 reveals a R. Therefore, the financial institution would offer the existing customer an overdraft service on the checking account. Referencing the check limit 510, the financial institution would cover up to $1200. if the customer withdraws more than the amount of funds in the customer's account.

If an existing customer's ChexSystem™ report reveals abuse information 506, such as an abuse code A (non-sufficient fund (NSF) activity), the customer's credit rating score is obtained. If the Credit Reporting Agency does not have a credit rating score for the customer (the customer's credit rating score is "no score"), the customer is not offered overdraft service (since the matrix 500 revealed an alphabetic designation code of S). The existing customer maintains a sub-prime checking account without overdraft service.

If an existing customer's ChexSystem™ report reveals abuse information 506, such as debit card revocation (abuse code K), the customer's credit rating score is obtained. If the customer's credit rating score is 488, the corresponding alphabetic designation code within the matrix 500 reveals a S. Therefore, the financial institution would offer the existing customer a checking account without overdraft service. The financial institution would return the draft designated NSF if the customer withdraws more than the amount in the customer's account.

Figure 6:
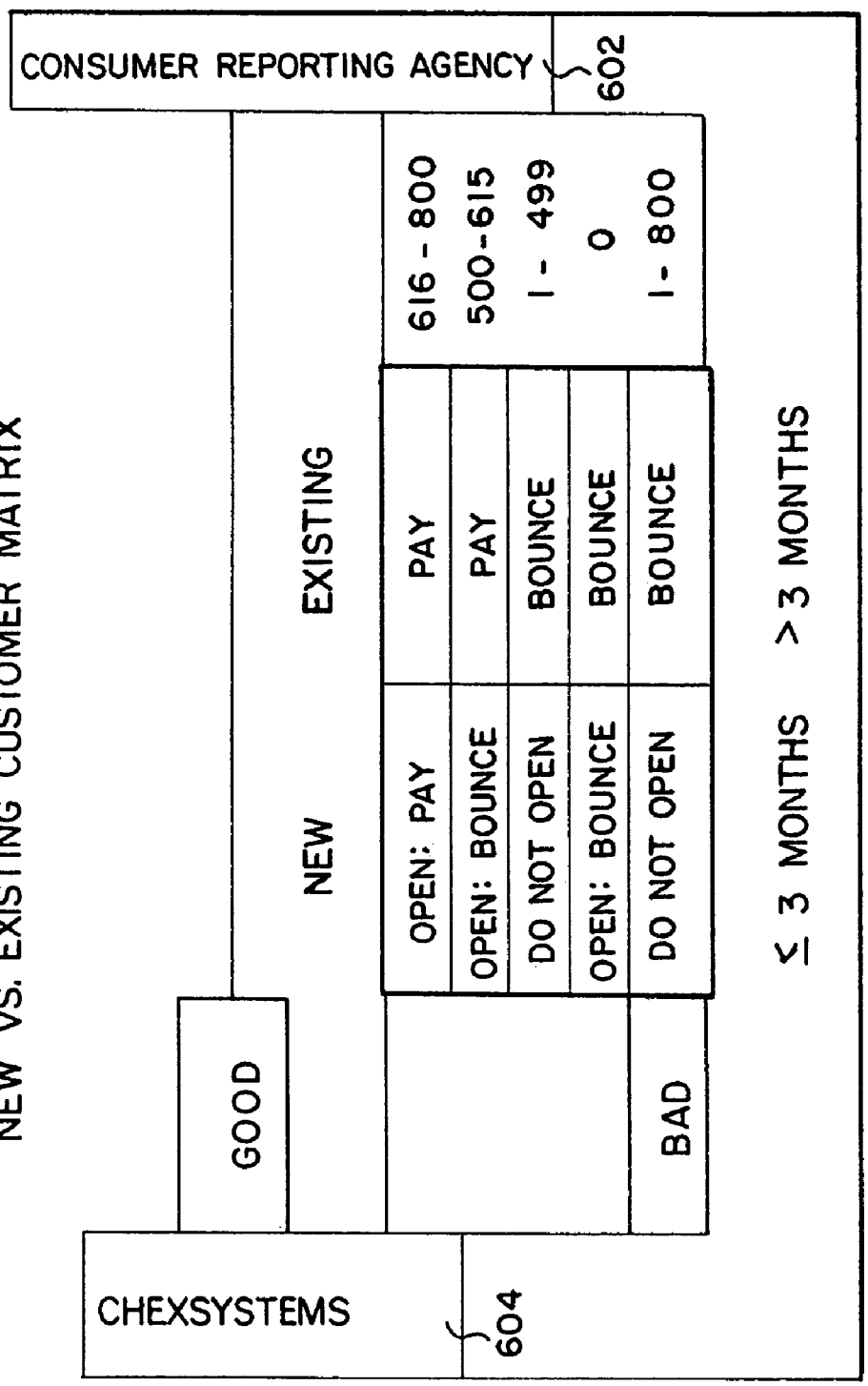
FIG. 6 is a summary matrix of the overdraft service according to one embodiment of the present invention.

FIG. 6 is a summary matrix of the overdraft service according to the invention. The summary matrix 600 illustrates the possible outcomes described by the Checking Account Approval Matrix for new checking accounts and a Checking Account Approval Matrix for existing checking accounts. The summary matrix 600 illustrates a new customer as having a checking account with the financial institution for three months or less and an existing customer as having a checking account with the financial institution for three months or more.

The ChexSystem™ report 604 is determined either good or bad. A good ChexSystem™ report is when the customer has no negative information. Although, the customer may have abuse information in their ChexSystem™ report. A bad ChexSystem™ report is when a customer has negative information, such as possible forgery. The Consumer Reporting Agency credit rating scores 602 are listed in the summary matrix 600. The credit rating scores are split according to the financial institutions discretion. Depending on the credit rating scores and the Consumer Reporting Agency used, the same credit rating score can be associated with different levels of potential risk, for example, a loss to the financial institution. Generally, a CRA score of 700 and above is considered low risk, a CRA score of 600 to 699 is moderate risk and 500 to 599 is high risk. A CRA score below 500 is extremely high risk. While most CRA providers have score sets that range from 1 to 800 there are some that range from 100 to 900. The financial institution determines the credit ranges based on the likelihood of loss within each range. The likelihood of loss is derived from the CRA's statistical studies of the performance of customers within each range. For example, one CRA may show that in the range of 700 to 720, the institution could expect losses to be less than one half of one percent, an acceptable loss for that particular institution. The same data may also show that in the range of 500 to 520, the institution could expect losses to be two percent, an unacceptable amount for the institution, thus, customers within the 500 to 520 category would not receive the overdraft feature. For example, the credit rating scores are divided into five ranges: (1) 614-800 (2) 500-613 (3) 1-499 (4) 0 (5) 1-800.

Depending on the customer's ChexSystem™ report 604 and credit rating score 602, the summary matrix 600 reveals whether the financial institution provides a checking account with overdraft service, the financial institution provides a sub-prime checking account, in which case the financial institution does not cover an overdraft or overdrafts or the financial institution does not provide a checking account—a checking account is not opened for a new customer or the checking account is closed for an existing customer. To illustrate, an existing customer has a good ChexSystem™ report 604 and a credit rating score 602 of 518, therefore, the financial institution should offer overdraft service to the customer. The amount of the privilege is determined from the recommended limit, or check limit. As another example, a new customer has a bad ChexSystem™ report 604 and a credit rating score 602 of 700, thus, the financial institution should not open or offer a checking account to the customer.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

We claim:

1. A risk assessment method directed to a potential customer performed by a computer system comprising the steps of:

accepting by the computer system depersonal information determined by socioeconomic data including one or more costs selected from the group of shelter, utilities and transportation;

determining a market limit score from the depersonal information;

receiving by the computer system personal information of the potential customer including one or more costs selected from the group of shelter, utilities and transportation;

calculating an institutional limit score from the personal information;

providing a check limit from analysis of the market limit score and the institutional limit score;

entering the check limit into a matrix that includes check verification data and credit rating score data;

generating by the computer system a check verification report for the potential customer that may contain negative information and abuse information;

retrieving a credit rating score for the potential customer;

comparing the check verification report with the check verification data of the matrix and the credit rating score with the credit rating score data of the matrix;

obtaining a designation code from the matrix; and arriving at an assessment of risk associated with the designation code from the matrix for the potential customer.

* * * * *

UNITED STATES PATENT AND TRADEMARK OFFICE
CERTIFICATE OF CORRECTION

| | | |
|---|---|---|
| PATENT NO. | : 7,676,408 B2 | Page 1 of 1 |
| APPLICATION NO. | : 10/937933 | |
| DATED | : March 9, 2010 | |
| INVENTOR(S) | : G. Michael Moebs and Kenneth A. Williams | |

It is certified that error appears in the above-identified patent and that said Letters Patent is hereby corrected as shown below:

On the Title Page the following "Related U.S. Application Data" should read:

Item (60) Provisional application No. 60/502,436, filed on September 12, 2003.

Signed and Sealed this
Twentieth Day of March, 2012

David J. Kappos
*Director of the United States Patent and Trademark Office*